US010333950B2

(12) United States Patent
Shehory

(10) Patent No.: US 10,333,950 B2
(45) Date of Patent: Jun. 25, 2019

(54) DEFENDING AGAINST MALICIOUS ELECTRONIC MESSAGES

(71) Applicant: International Business Machines Corporation, Armonk, NY (US)

(72) Inventor: Onn Shehory, Kiryat-Ono (IL)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 15/143,588

(22) Filed: May 1, 2016

(65) Prior Publication Data

US 2017/0318038 A1 Nov. 2, 2017

(51) Int. Cl.
| G06F 21/56 | (2013.01) |
| H04L 29/06 | (2006.01) |
| G06F 21/57 | (2013.01) |
| G06F 21/55 | (2013.01) |
| H04L 12/58 | (2006.01) |
| H04L 9/32 | (2006.01) |

(52) U.S. Cl.
CPC ........ *H04L 63/1416* (2013.01); *G06F 21/554* (2013.01); *G06F 21/56* (2013.01); *G06F 21/577* (2013.01); *H04L 51/12* (2013.01); *H04L 63/1441* (2013.01); *G06F 2221/034* (2013.01)

(58) Field of Classification Search
None
See application file for complete search history.

(56) References Cited

U.S. PATENT DOCUMENTS

| 7,451,487 | B2 | 11/2008 | Oliver et al. |
| 7,904,518 | B2 | 3/2011 | Marino et al. |
| 8,010,609 | B2 | 8/2011 | Cowings et al. |
| 8,271,588 | B1 | 9/2012 | Bruno et al. |
| 2006/0123464 | A1 | 6/2006 | Goodman et al. |
| 2007/0233787 | A1* | 10/2007 | Pagan .................. G06Q 10/107 709/206 |
| 2012/0124664 | A1* | 5/2012 | Stein ....................... G06F 15/16 726/22 |
| 2012/0246725 | A1* | 9/2012 | Osipkov ................ G06F 21/572 726/23 |
| 2016/0142429 | A1* | 5/2016 | Renteria ............. H04L 63/1416 726/23 |

OTHER PUBLICATIONS

Eve Edelson., "The 419 scam: information warfare on the spam front and a proposal for local filtering", Computers & Security, vol. 22, Issue 5, Jul. 2003, pp. 392-401. Can be found at: http://www.sciencedirect.com/science/article/pii/S0167404803005054.
Engin Kirda and Christopher Kruegel., "Protecting Users Against Phishing Attacks with AntiPhish", 29th Annual International Computer Software and Applications Conference (COMPSAC'05) (vol. 1 ), Date of Conference Jul. 26-28, 2005, pp. 517-524 vol. 2.

* cited by examiner

*Primary Examiner* — Venkat Perungavoor
(74) *Attorney, Agent, or Firm* — Dan Swirsky

(57) ABSTRACT

Defending against malicious electronic messages by analyzing electronic messages sent via a computer network to identify predefined risk elements found within the electronic messages, detecting attempts to perform computer-mediated actions that are associated with the electronic messages, identifying a potential security risk associated with the electronic messages and the computer-mediated actions, and performing a predefined preventive security action responsive to identifying the potential security risk.

7 Claims, 5 Drawing Sheets

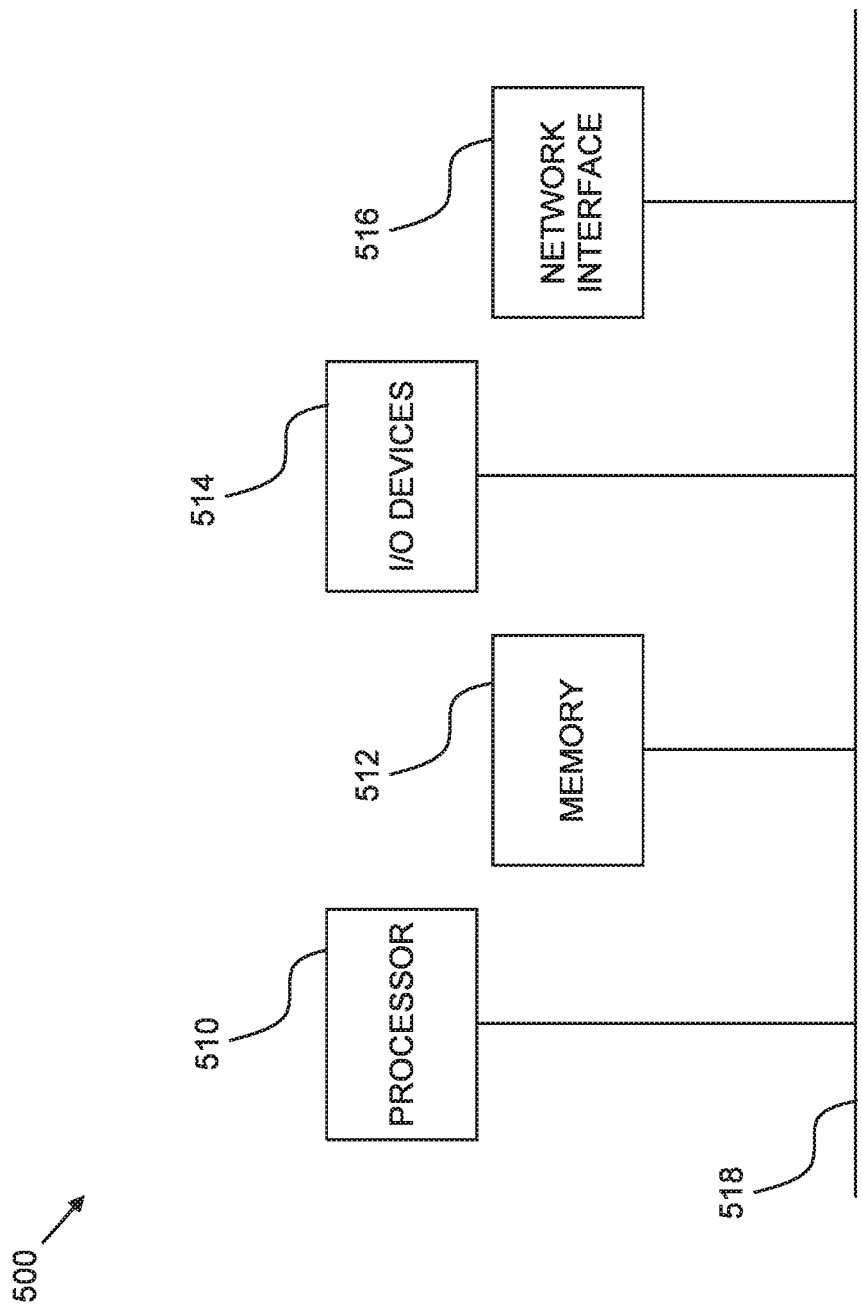

DEFENDING AGAINST MALICIOUS ELECTRONIC MESSAGES

BACKGROUND

Many scams involve sending malicious electronic messages to recipients, such as where the electronic messages are email messages or instant messaging messages, where such messages are designed to induce recipients to perform actions with often detrimental effects, such as financial loss, exposure of sensitive information, and compromised computer security. While such messages are typically ignored by recipients, some recipients do respond and are victimized. In fact, professional message scam artists often assume a low per-message response rate and target recipients with multiple messages designed to gradually achieve the desired results.

SUMMARY

In one aspect of the invention a computer-implemented method is provided for defending against malicious electronic messages, the method comprising: analyzing at least one electronic message sent via a computer network to identify at least one predefined risk element found within the at least one electronic message, detecting an attempt by a computer user to perform a computer-mediated action that is associated with the at least one electronic message, identifying a potential security risk associated with either of the at least one electronic message and the computer-mediated action, and performing a predefined preventive security action responsive to identifying the potential security risk.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which:

FIG. 5 is a simplified block diagram illustration of an exemplary hardware implementation of a computing system, constructed and operative in accordance with an embodiment of the invention.

DETAILED DESCRIPTION

Figure 1:
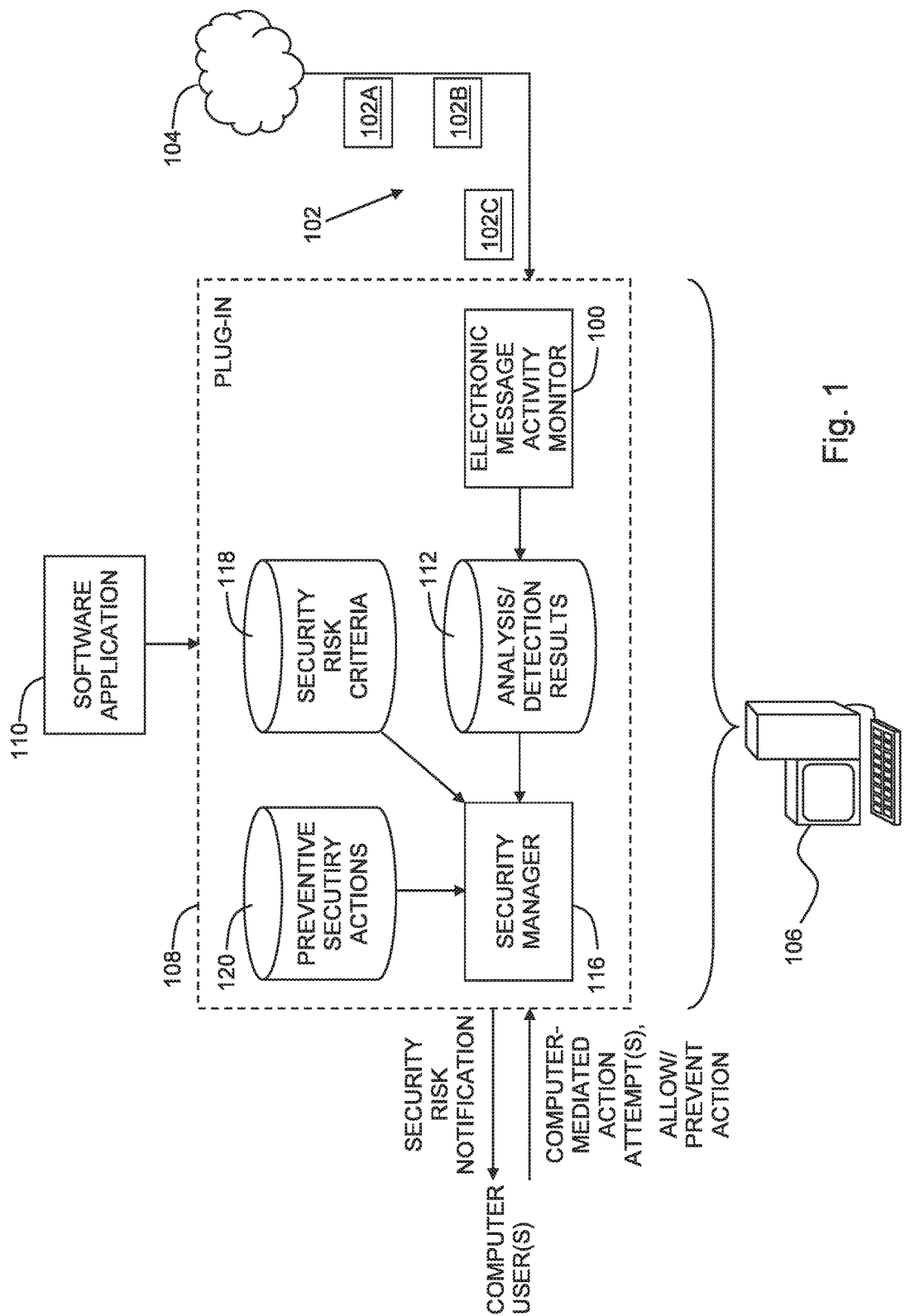
FIG. 1 is a simplified conceptual illustration of a system for defending against malicious electronic messages, constructed and operative in accordance with an embodiment of the invention.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a simplified conceptual illustration of a system for defending against malicious electronic messages, constructed and operative in accordance with an embodiment of the invention. In the system of FIG. 1, an electronic message activity monitor 100 is configured to analyze one or more of electronic messages 102A, 102B, and 102C, hereinafter referred to as electronic messages 102, such as email messages or instant messaging messages, that are sent via a computer network 104, such as the Internet, and accessed at a computer 106, which may be any type of device with computing capabilities. Electronic message activity monitor 100 accesses electronic messages 102 by passively monitoring electronic messages 102 and/or by actively intercepting electronic messages 102 in accordance with conventional techniques. In one embodiment, electronic message activity monitor 100 is implemented as a plug-in 108 to a software application 110, such as an email client or instant messaging client, that is configured with computer 106, where electronic messages 102 are accessed by software application 110.

Electronic message activity monitor 100 is preferably configured in accordance with conventional techniques to analyze electronic messages 102 to determine the presence of predefined risk elements within electronic messages 102. Such risk elements may, for example, be in the form of predefined suspicious words or phrases, such as may, for example, be associated with requests for help, business solicitations involving large sums of money, prize winning, notifications regarding account violations or blockages, notifications regarding renewing or changing account details, credentials or passwords, and software update requests. Other risk elements may, for example, be in the form of direct or indirect requests for sensitive information that meets predefined sensitive information criteria, and computer network addresses, such as email addresses and uniform resource locators (URLs).

Electronic message activity monitor 100 is also preferably configured in accordance with conventional techniques to detect one or more attempts by one or more users of computer 106 to perform computer-mediated actions, where associations between the computer-mediated actions and any of electronic messages 102 are identified. For example, any of the computer-mediated actions may be an attempt to send an email message to an email address indicated by any of electronic messages 102, an attempt to retrieve a web page or other electronic document at a URL indicated by any of electronic messages 102, or an attempt to expose sensitive information requested by any of electronic messages 102.

Electronic message activity monitor 100 preferably stores the results of its analysis and detection activity described hereinabove in results 112, which is any type of computer-readable data storage medium and format.

A security manager 116, which may likewise be implemented as plug-in 108, is configured to identify a potential security risk associated with any of electronic messages 102 and/or the computer-mediated actions by applying predefined security risk criteria 118 to the results of the analysis and detection performed by electronic message activity monitor 100. In one embodiment, the various predefined risk elements found within electronic messages 102 by electronic message activity monitor 100 are assigned various predefined risk values, and predefined security risk criteria 118 indicate that a potential security risk exists if the total risk value of the predefined risk elements found within any one of electronic messages 102, or across multiple electronic messages 102 that are sent by the same sender or that are sent by multiple senders regarding the same topic, meets or exceeds a predefined threshold value. In another version of this embodiment, predefined security risk criteria 118 indicate that a potential security risk exists if detection is made of an attempt by a user of computer 106 to perform a computer-mediated action in association with any of electronic messages 102 as described hereinabove, such as exposing sensitive information that meets predefined sensitive information criteria, even if the total risk value of the predefined risk elements found within electronic messages 102 is lower than the predefined threshold value, such as by less than a predefined amount. Additionally or alternatively, the various types of computer-mediated actions described hereinabove are assigned various predefined risk values, and predefined security risk criteria 118 indicate that a potential security risk exists if the individual or total risk values of the one or more detected attempts to perform such computer-mediated actions meets or exceeds the predefined threshold value, or does so when added to the individual or total risk values determined for the predefined risk elements found within electronic messages 102 as described hereinabove.

Security manager 116 is preferably configured in accordance with conventional techniques to perform a predefined preventive security action 120 responsive to identifying a potential security risk as described hereinabove, where preventive security action 120 is preferably performed prior to one or more of the detected computer-mediated action being performed. In one embodiment, security manager 116 simply prevents one or more of the detected computer-mediated actions from being performed. In another embodiment, security manager 116 notifies a computer user, such as a user of computer 106 and/or a computer systems administrator of computer 106, of the potential security risk, prompting the computer user to selectably allow one or more of the computer-mediated actions to be performed or prevent one or more of the computer-mediated actions from being performed.

Any of the elements shown in FIG. 1 are preferably implemented in computer hardware and/or in computer software embodied in a non-transitory, computer-readable medium in accordance with conventional techniques.

Figure 2:
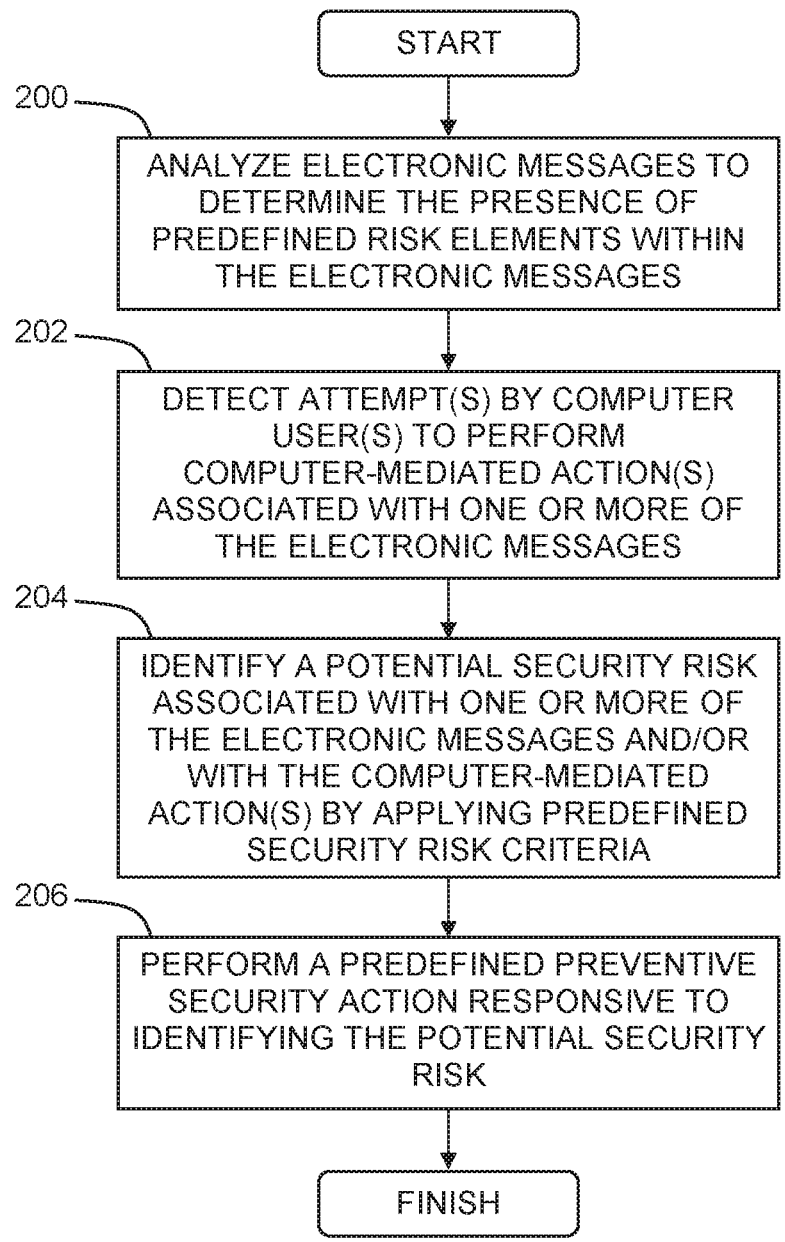
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, one or more electronic messages sent via a computer network and accessed at a computer are analyzed to determine the presence of predefined risk elements within the electronic messages (step 200). One or more attempts by a computer user to perform computer-mediated actions are detected, where the computer-mediated actions are associated with one or more of the electronic messages (step 202), such as an attempt to send an email message to an email address indicated by any of the electronic messages, an attempt to retrieve a web page or other electronic document at a URL indicated by any of the electronic messages, or an attempt to expose sensitive information requested by any of the electronic messages. A potential security risk associated with one or more of the electronic messages and/or with one or more of the computer-mediated actions is identified by applying predefined security risk criteria to the results of the electronic message analysis and/or the computer-mediated action attempt detections (step 204). A predefined preventive security action is performed responsive to identifying the potential security risk, where the preventive security action is preferably performed prior to one or more of the computer-mediated actions being performed (step 206), such as by preventing one or more of the computer-mediated actions from being performed, notifying a computer user of the potential security risk, and/or prompting the computer user to selectably allow one or more of the computer-mediated actions to be performed or prevent one or more of the computer-mediated actions from being performed.

Figure 3:
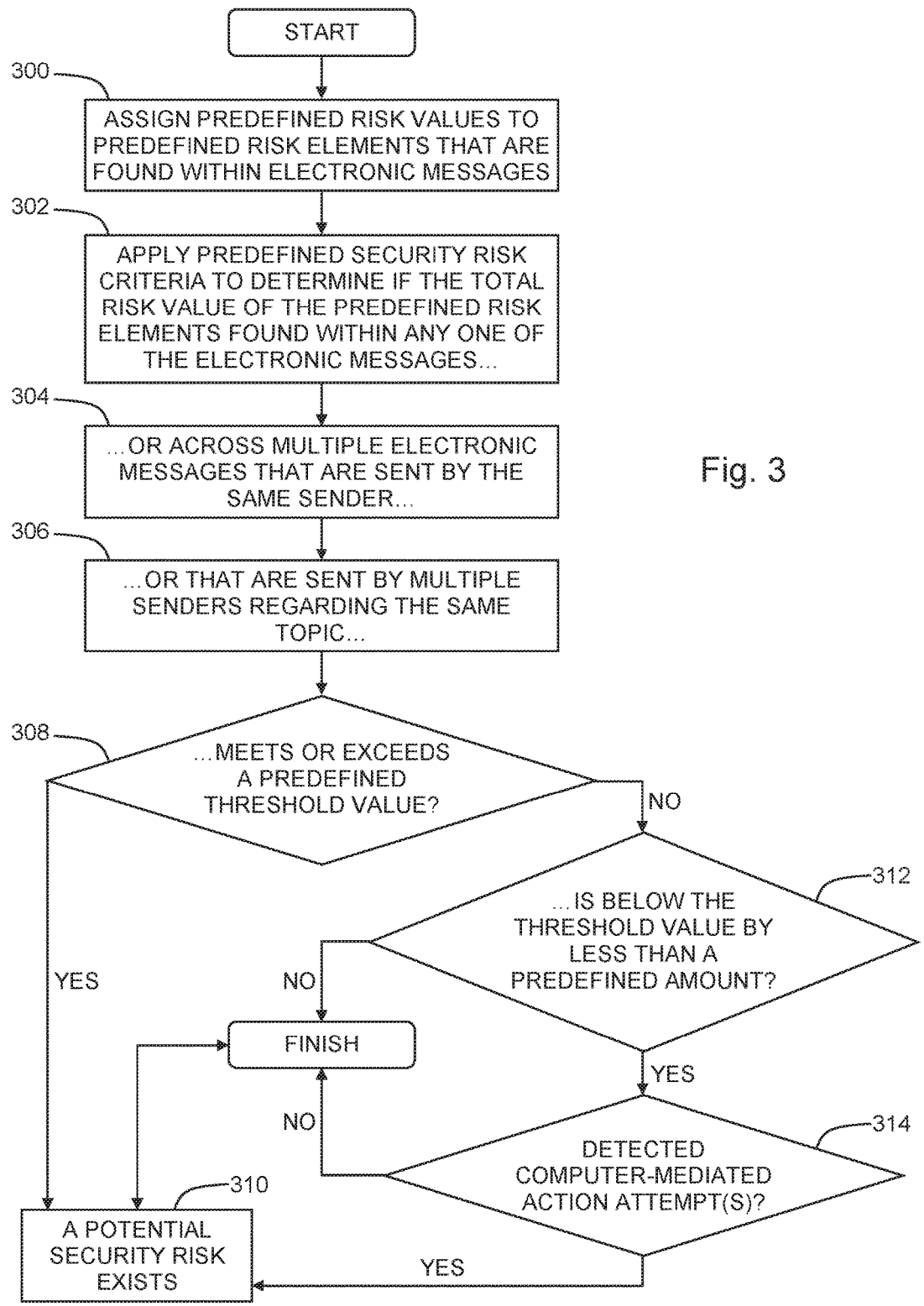
FIGS. 3 and 4 are simplified flowchart illustrations of exemplary methods of identifying a potential security risk, operative in accordance with an embodiment of the invention.

Reference is now made to FIG. 3 which is a simplified flowchart illustration of an exemplary method of identifying a potential security risk, operative in accordance with an embodiment of the invention. In the method of FIG. 3, which may be used to perform step 204 of the method of FIG. 2, predefined risk elements that are found within electronic messages are assigned predefined risk values (step 300). Predefined security risk criteria indicate that if the total risk value of the predefined risk elements found within any one of the electronic messages (step 302), or across multiple electronic messages that are sent by the same sender (step 304), or that are sent by multiple senders regarding the same topic (step 306), meets or exceeds a predefined threshold value (step 308), then a potential security risk exists (step 310). Additionally or alternatively, if the total risk value of the predefined risk elements is lower than the predefined threshold value by less than a predefined amount (step 312), and one or more attempts by one or more computer users to perform computer-mediated actions are detected (step 314), where the computer-mediated actions are associated with one or more of the electronic messages, then a potential security risk exists (step 310).

Figure 4:
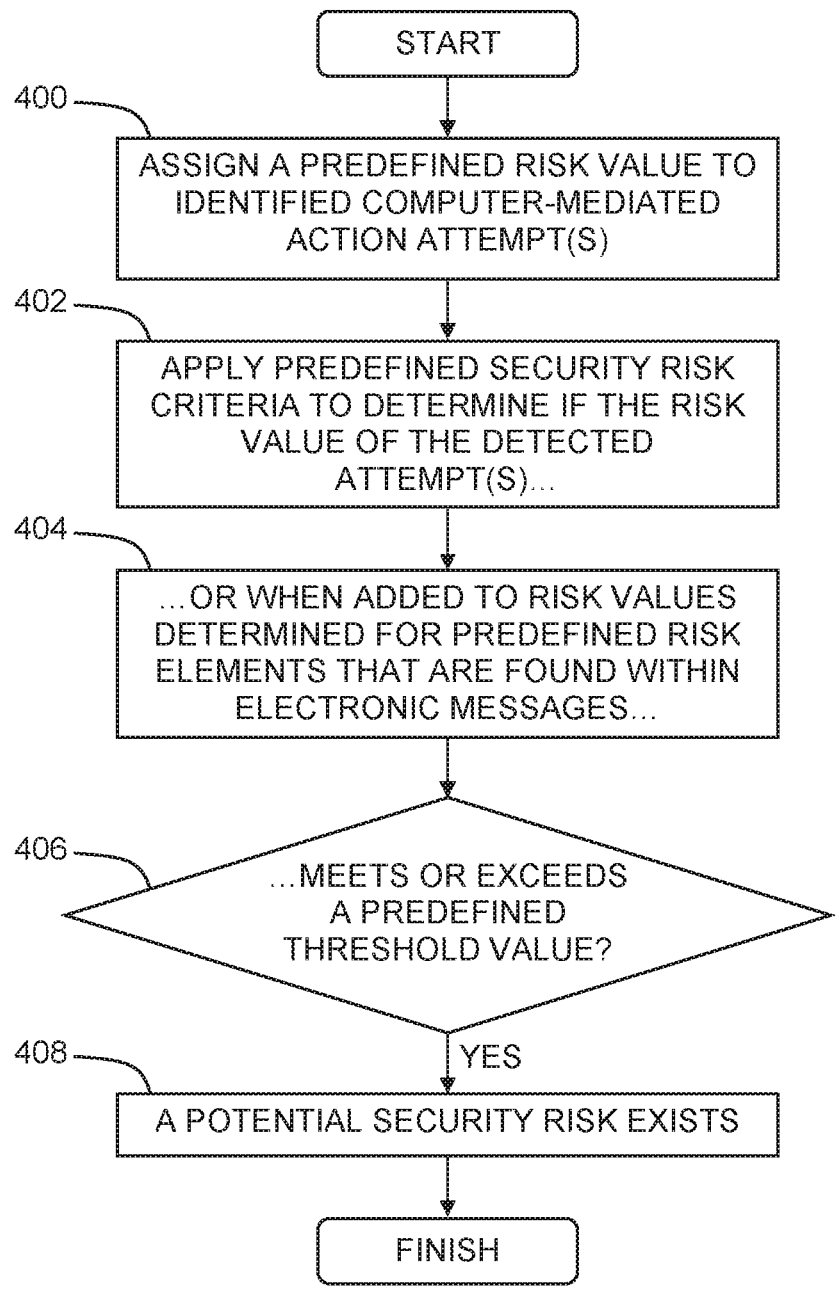

Reference is now made to FIG. 4 which is a simplified flowchart illustration of an exemplary method of identifying a potential security risk, operative in accordance with an embodiment of the invention. In the method of FIG. 4, which may be used to perform step 204 of the method of FIG. 2, identified computer-mediated action attempts are assigned predefined risk values (step 400). Predefined security risk criteria indicate that if the individual or total risk values of one or more of the detected attempts (step 402) meets or exceeds a predefined threshold value (step 406), or does so when added to the individual or total risk values determined for predefined risk elements that are found within one or more of the electronic messages (step 404), such as by using the method of FIG. 3, then a potential security risk exists (step 408).

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for defending against malicious electronic messages, the method comprising:
analyzing a plurality of electronic messages, wherein each of the electronic messages is either of a) an electronic mail message and b) an instant message sent via a computer network, to identify a plurality of predefined risk elements, wherein the plurality of predefined risk elements include any of
a predefined suspicious word or phrase included in any of the plurality of electronic messages, and
a computer network address included in any of the plurality of electronic messages;
detecting an attempt by a computer user to perform a computer-mediated action that is associated with any of the plurality of electronic messages, wherein the computer-mediated action includes either of a) sending information to the computer network address and b) retrieving information located at the computer network address;
assigning a predefined risk value to each of the plurality of predefined risk elements;
determining a total of the risk values of the plurality of predefined risk elements found across the plurality of electronic messages, wherein the plurality of electronic messages are sent by a common sender or sent by multiple senders regarding a common topic;
identifying a potential security risk associated with any of the plurality of electronic messages and the computer-mediated action if the total of the risk values of the plurality of predefined risk elements found across the plurality of electronic messages meets or exceeds a predefined threshold value; and
performing a predefined preventive security action responsive to identifying the potential security risk.

2. The method according to claim 1 wherein the detecting comprises detecting wherein the computer-mediated action comprises accessing an electronic document from at least one computer network address indicated by any of the plurality of electronic messages.

3. The method according to claim 1 wherein the performing comprises prompting the computer user to selectably allow the computer-mediated action to be performed or prevent the computer-mediated action from being performed.

4. A system for defending against malicious electronic messages, the system comprising:
an electronic message activity monitor configured to
analyze a plurality of electronic messages, wherein each of the electronic messages is either of a) an electronic mail message and b) an instant message sent via a computer network, to identify a plurality of predefined risk elements, wherein the plurality of predefined risk elements include any of
a predefined suspicious word or phrase included in any of the plurality of electronic messages, and
a computer network address included in any of the plurality of electronic messages, and
detect an attempt by a computer user to perform a computer-mediated action that is associated with any of the plurality of electronic messages, wherein the computer-mediated action includes either of a) sending information to the computer network address and
b) retrieving information located at the computer network address; and
a security manager configured to
assign a predefined risk value to each of the plurality of predefined risk elements,
determine a total of the risk values of the plurality of predefined risk elements found across the plurality of electronic messages, wherein the plurality of electronic messages are sent by a common sender or sent by multiple senders regarding a common topic,
identify a potential security risk associated with any of the plurality of electronic messages and the computer-mediated action if a total of the risk values of the plurality of predefined risk elements found across the plurality of electronic messages meets or exceeds a predefined threshold value, and
perform a predefined preventive security action responsive to identifying the potential security risk.

5. The system according to claim 4 wherein the computer-mediated action comprises accessing an electronic document from at least one computer network address indicated by any of the plurality of electronic messages.

6. The system according to claim 4 wherein the preventive security action comprises prompting the computer user to selectably allow the computer-mediated action to be performed or prevent the computer-mediated action from being performed.

7. A computer program product for defending against malicious electronic messages, the computer program product comprising:
a non-transitory, computer-readable storage medium; and
computer-readable program code embodied in the storage medium, wherein the computer-readable program code is configured to
analyze a plurality of electronic messages, wherein each of the electronic messages is either of a) an electronic mail message and b) an instant message sent via a computer network, to identify a plurality of predefined risk elements, wherein the plurality of predefined risk elements include any of
a predefined suspicious word or phrase included in any of the plurality of electronic messages, and
a computer network address included in any of the plurality of electronic messages,
detect an attempt by a computer user to perform a computer-mediated action that is associated with any of the plurality of electronic messages, wherein the computer-mediated action includes either of a) sending information to the computer network address and
b) retrieving information located at the computer network address,
determine a total of the risk values of the plurality of predefined risk elements found across the plurality of electronic messages, wherein the plurality of electronic messages are sent by a common sender or sent by multiple senders regarding a common topic,
assign a predefined risk value to each of the plurality of predefined risk elements,
identify a potential security risk associated with any of the plurality of electronic messages and the computer-mediated action if a total of the risk values of the plurality of predefined risk elements found across the plurality of electronic messages meets or exceeds a predefined threshold value, and perform a predefined preventive security action responsive to identifying the potential security risk.

* * * * *